Patented Mar. 5, 1946

2,395,959

UNITED STATES PATENT OFFICE 2,395,959

PROCESS FOR OBTAINING BUTADIENE IN A MORE CONCENTRATED FORM

Frank J. Soday, Swarthmore, Pa., assignor to The United Gas Improvement Company, a corporation of Pennsylvania No Drawing. Application October 30, 1942, Serial No. 463,947

8 Claims. (Cl. 260—681.5)

This invention relates to the concentration of diolefines.

More particularly, this invention pertains generally to the recovery of butadiene in more concentrated form from liquids containing the same, and pertains particularly to such operations wherein solid dry salts of metals of groups IB and IIB of the periodic system are employed.

An object of the present invention is the production of relatively large proportions of concentrated butadiene from a more dilute fraction or mixture containing the same. Another object of the invention is the production of a by-product fraction or mixture containing relatively small, or negligible, proportions of butadiene. Other objects and advantages of the invention will be apparent to those skilled in the art upon an inspection of the specification and claims.

Solid dry salts of metals of groups IB and IIB of the periodic system and particularly monovalent salts of heavy metals of these groups, such as the halides, nitrates, sulfates, phosphates, formates, acetates, lactates, propionates, and carbonates of copper, mercury, and silver, may be employed for the recovery in more concentrated form from mixtures of butadiene by the formation of an association product, or a complex, of butadiene with one or more of said salts under suitable temperature and pressure conditions, which complex or association product may be afterward dissociated, usually after separation from the unreacted material, to liberate the butadiene and regenerate the reagent salt. Such dissociation or decomposition may be carried out by an increase in temperature and/or a reduction in pressure.

Monovalent cuprous salts are very desirable agents for use in concentrating processes of this type due to their stability, ease of regeneration, low cost, and availability. Cuprous chloride is a particularly desirable salt to be used for this purpose.

Frequently, it is found to be technically advantageous to first resort to fractional distillation or other means to narrow the boiling range of the butadiene fraction or mixture. Thus, a C₄ cut containing butadiene, butenes, and, perhaps, butanes may be treated to obtain a more highly concentrated butadiene fraction.

Such concentrated butadiene fractions may be treated with solid dry reagent salts of the type described herein to isolate the butadiene in more highly concentrated, or substantially pure form, or wider boiling fractions and/or less concentrated fractions may be employed for this purpose.

The butadiene fractions and/or mixtures which may be concentrated by my process may be obtained from any desired source, such as synthetically, by the pyrolysis of petroleum or petroleum hydrocarbons, or by the pyrolysis or dehydrogenation of organic materials in general, such as alcohol.

As described and claimed in my copending application, Serial No. 457,187, filed September 3, 1942, the efficiency of such solid dry reagent salts is increased substantially by the incorporation therein of a solid inorganic basic substance, such as an oxide of an alkali metal and/or an oxide of an alkaline earth metal, in conjunction with a polymerization inhibitor, such as a secondary aryl amine; a polynuclear phenol, a polyhydroxy phenol, and/or a substituted phenolic material; and the reaction product of an aldehyde or a ketone with an amine.

In my copending application, Serial No. 460,692, filed October 3, 1942, the concentration of unsaturated hydrocarbon fractions and/or mixtures by the application of a reagent salt of the type described in an unusually fine state of subdivision is described and claimed. Exceptionally desirable results are obtained when at least the major portion of the dry reagent salt comprises particles having a diameter of less than 0.05 mm. and, more particularly, less than 0.03 mm. Even better results are obtained when at least the major portion of the dry reagent salt comprises particles having a diameter of less than 0.02 mm., and particularly less than 0.01 mm.

I have discovered that butadiene may be obtained more readily and/or in a higher state of purity from dilute fractions and/or mixtures containing the same in processes involving the use of at least one solid, dry salt of a metal of groups IB and IIB of the periodic system when such operations are conducted at least in part under subatmospheric pressures and temperatures of not less than 25° C., and more particularly not less than 30° C.

The concentration of butadiene by the application of one or more reagent salts of the type described customarily is conducted by contacting the butadiene fraction or mixture with the desired reagent salt under conditions designed to form a complex or addition product between the butadiene and the reagent salt, permitting the reaction to proceed to the desired extent, removing the unreacted portion of the said fraction or mixture, such as by distillation, and decomposing the addition product by the application of elevated temperatures to regenerate the butadiene in more concentrated, or substantially pure, form.

This operation is somewhat time consuming, particularly when a product having a fairly high degree of purity, such as a product having a concentration of butadiene of not less than 90%, and more particularly, not less than 95%, is desired. In addition, the product obtained frequently contains less than the desired concentration of butadiene and/or the initial by-product fraction secured contains more than the permitted proportion of butadiene. If an intermediate fraction, which may be referred to as the recycle fraction, is taken, this also may contain an unduly large proportion of butadiene.

These undesirable results appear to be due, at least in part, to the difficulties encountered in removing the unreacted material from the addition product or reagent salt-butadiene complex. This may be due to the difficulties encountered in transmitting heat throughout the reaction mass, or to an actual adsorption of a portion of the unreacted material on the surface of the reagent salt and/or reagent salt-butadiene complex. In any event, a portion of the unreacted material frequently remains in the reagent mass until substantial proportions of the addition product have been decomposed. This usually results in the isolation of an unduly large proportion of the butadiene in the initial by-product fraction and/or in the intermediate or recycle fraction, if any intermediate fraction is collected; and/or the isolation of a product containing less than the desired proportion of butadiene.

The foregoing may be summed up by stating that the retention of unreacted material by the reaction mass frequently leads to the production of a butadiene concentrate containing less than the desired proportion of butadiene and/or to the isolation of unduly large proportions of butadiene in the initial and/or intermediate fractions.

The concentrating process may be considered to consist of the following series of operations.

1. Absorption of the butadiene from the fraction or mixture by the reagent salt, resulting in the formation of an addition compound between the butadiene and the reagent salt.
2. The removal of the unreacted material, usually by distillation, which may be carried out in such a manner as to form one or more cuts. When multiple cuts are taken, the final cut, or any mixture of cuts other than the initial cut, may be designated as the recycle stock.
3. The desorption of the addition compound, usually by the application of heat, to liberate the butadiene, and regenerate the reagent salt.

As pointed out previously, I have discovered that such operations may be carried out in a more satisfactory manner by the application of reduced pressures in conjunction with the use of a temperature of not less than 25° C. during at least a portion of the said operations.

The benefits of this invention may be substantially realized by removing at least the latter portions of the unreacted material under reduced pressures and the application of temperatures of not less than 25° C. Thus in the concentration of a butadiene fraction, after the absorption has been completed a portion of the unreacted material may be removed by releasing the pressure on the system and/or by the application of heat, care being taken not to exceed the decomposition point of the butadiene-reagent salt complex. The pressure on the system then is reduced until the unreacted material is removed to the desired extent, using a temperature of not less than 25° C.

The entire operation of removing the unreacted material also may be carried out under reduced pressure and the use of temperatures of not less than 25° C., with a consequent reduction in the length of time required to complete this operation.

Due consideration must be given to the decomposition temperature of the butadiene-reagent salt complex in order to prevent the decomposition of an unduly large proportion of this material during the removal of the unreacted material. When cuprous chloride is employed as the reagent salt, the complex formed between this material and butadiene has a vapor pressure of 760 mm. at a temperature of approximately 64° C. At 50° C. it has a vapor pressure of approximately 250 mm., and at 35° C. a vapor pressure of 70 mm.

The preferred upper temperature limit to be employed in the removal of the unreacted material depends largely upon the pressures under which such operations are conducted. In general, I prefer to employ temperatures which are at least 5° and more preferably 10° C., below the decomposition point of the butadiene-reagent salt complex.

Thus, in the case of butadiene and cuprous chloride, the olefins preferably are removed at a temperature not exceeding 59° C. at 760 mm., 45° C. at 250 mm., and 30° C. at 70 mm.

It should be understood, of course, that somewhat higher temperatures, which may approach or equal that of the decomposition point of the butadiene-reagent salt complex, may be employed for a relatively short portion of time near the end of this operation if a product having an unusually high degree of purity is required. Even in such cases, however, I generally prefer not to employ temperatures of that order, but rather to continue the removal of unreacted material at temperature within the limits set forth previously for a somewhat longer period of time.

After removal of unreacted material, the reagent salt-butadiene complex may be decomposed by heating it to a temperature equal to or greater than that required to decompose it at the pressures employed, and/or by a further reduction in pressure to accomplish the same purpose. The desorption operation may be carried out under subatmospheric, atmospheric, or superatmospheric pressures.

The concentration of a butadiene fraction or mixture by this method may be summarized briefly as follows. The absorption may be carried out at any desired pressure, although atmospheric or superatmospheric pressures are preferred. The absorption temperature may be varied somewhat, but I generally prefer to employ temperatures not exceeding 40° C., and more particularly temperatures not exceeding 30° C., at atmospheric or superatmospheric pressures. The removal of unreacted material is carried out by the application, for at least a portion of the time, of subatmospheric pressures and temperatures of not less than 25° C. The maximum temperature employed at this stage of the operation preferably is at least 5° C. below the decomposition point of the butadiene-reagent salt complex. The desorption operation, in which the butadiene is recovered in more highly concentrated and/or purified form may be carried out at subatmospheric, atmospheric, or superatmospheric pressures, preferably employing a temperature equal to or greater than the decomposition point of the butadiene-reagent salt complex at the pressure employed.

By the use of temperatures of at least 25° C., and more preferably at least 30° C. under subatmospheric pressures for the removal of at least a portion of the unreacted material present, an olefine fraction containing less butadiene and a butadiene concentrate containing higher percentages of butadiene, as well as higher yields of such butadiene concentrate, is obtained than when lower temperatures, such as 20° C. or lower, are employed for the same period of time.

The concentrating process may be carried out in any desired manner. A satisfactory method involves the use of a ball, rod, or other mill capable of maintaining the reagent salt in the desired degree of fineness. The mill or vessel may be provided with balls, rods, chains, and/or other units designed to maintain the reagent salt in the desired degree of fineness and/or prevent caking or the formation of large particles and/or lumps.

When balls or pebbles are employed for this purpose, the quantity used preferably should be at least equal in weight to the weight of the reagent salt, and more preferably at least three times the weight of the reagent salt.

When chains are employed such units may be used alone or in combination with other units, such as balls, rods, or other grinding, or crushing devices. The chains may be employed loosely in the mill or they may be attached to the walls or sides thereof at one or more points. In case the chains are attached to the inner surface of the unit, a curtain effect is achieved which greatly assists in breaking up the reagent mass and in transmitting heat therethrough.

In this connection, it is well to point out that optimum results are achieved when the reagent salt is maintained in a state of very fine subdivision during the absorption-desorption cycle and the surface of the mill or other reaction unit is relatively free of reagent salt and/or other deposits. Such deposits interfere with heat-exchange relationships and tend to retard the volatilization of any unreacted and/or liberated hydrocarbon materials present in the deposit.

In my copending application previously referred to, specific methods for accomplishing these results are described and claimed. These include the use of a wall-scraping unit, a plow or similar cutting device; the use of irregularly-shaped grinding objects; and/or the use of special ball or other grinding or milling units, such as a double-conical ball mill.

Thus, the dry reagent salt may be reduced to, and maintained in, the desired degree of subdivision by the use of irregularly shaped abrading objects, either alone or in conjunction with the spherical objects normally employed for this purpose in typical ball mill operations.

Such irregularly shaped objects are designed to scrape, rather than roll, over the inner surface of the mill, thus keeping it clean and preventing the formation of a layer of reagent salt thereon. With the walls of the mill clean at all times, thus eliminating any cushioning effect during the grinding operations, the formation of agglomerized particles in the interior of the reaction mass also is largely, if not entirely, prevented.

These irregularly shaped objects may have almost any desired form, such as oblong, pyramidal, hexagonal, octagonal, cylindrical, and the like. Particularly desirable types are objects having one dimension at least twice the magnitude of the other dimension, and preferably even more, such as rods or rod-shaped objects. The rods may be of any desired length, and may contain any number and type of projections along their long axis to serve as abraders to keep the inner surface of the mill clean.

It is to be understood, of course, that more than one type of irregularly shaped object may be employed simultaneously in the mill, and that such irregularly shaped objects may be used in conjunction with the usual type of spherical objects, such as metallic balls or flint pebbles.

Another satisfactory method for maintaining the reagent salt in the desired state of very fine subdivision is the use of a scraping agitator or a plow on the inner wall of the mill. The scraping agitator may comprise a blade extending the entire length of the mill and mounted on a support by means of freely swinging pivots. By the use of suitable springs, the scraping blade may be urged against the inner wall of the mill with sufficient force to effectively remove any deposits of dry reagent salt thereon. Such scraper blade preferably is used in conjunction with spherical or non-spherical metallic, or other, objects which serve to maintain the loosened mass in the desired very fine state of subdivision. In order not to interfere with the action of the balls or other abrading devices, the scraper blade should be placed outside the zone of operation of such objects. As this includes the bottom of the mill and at least a portion of the side toward which the mill is rotating, the scraper blade, or blades, should be placed near, or at, the top of the mill, or at the opposite side of the mill, that is, at the clean side of the mill.

The use of more than one scraper blade will be found to be desirable in certain instances, and at least one of the blades may be provided with a serrated edge, or with teeth or other cutting units, to assist in breaking up the deposit of dry reagent salt on the inner surface of the mill.

An alternative method of operating the mill comprises maintaining the mill in a stationary position and rotating the scraper blade, or scraper blades, therein. In this method of operation, the scraper blades preferably are attached to a fairly broad support, or blade, which serves to revolve the balls, or other objects, contained in the mill to assist in pulverizing the reagent mass.

In place of the scraper blade, or blades, a plow arrangement may be employed to remove any deposits from the inner surface of the mill. This plow which may be of any suitable design and may possess a straight or serrated cutting edge, or be provided with teeth, prongs, or other cutting or digging devices, is suitably arranged to operate in a slot, depression, or track in a supporting member extending lengthwise of the mill, and is suitably urged against the inner surface of the mill to remove deposits of reagent salt formed thereon by means of a spring, or springs, which may be of the coil, leaf, or other desired type. The movement of the plow back, and forth along the long axis of the mill, together with the circular motion of the mill, serves to effectively remove any deposits of reagent salts on the inner surface of the mills.

As in the case of the scraper previously described, the plow preferably is employed in conjunction with grinding or pulverizing agents, such as spherical balls and/or irregularly shaped metallic, or other objects, which serve to maintain the reagent salt in a very fine state of subdivision. In such case, the plow and its supporting member preferably is located in such position as not to interfere with the grinding and pulverizing action of the balls, or other objects, present.

A plurality of plows also may be employed, and such units may be affixed to one, or more than one, supporting member.

As in the case of the scraping agitator described previously, the plow and its supporting member may be revolved in a stationary mill, in which case the supporting member or supporting members preferably are of such design as to impart sufficient motion to the balls, or other pulverizing agents, present in the mill to maintain the reagent salt in the desired very finely divided state.

Very satisfactory results also may be obtained by the use of a double conical mill. In this type of mill, the design is such as to impart both a sliding and rolling motion to the balls or other pulverizing agents employed therein, and to increase the effective pulverizing action of the said balls by causing the material to pour in the rolling stream into the lower cone at each half revolution, striking the wall of that cone, and curling upward and over toward the center, each particle taking a different course because of the cone surface. The apices of the truncated cones are perpendicular to the axis of rotation. This increases the effective velocity of the balls, and hence their grinding and pulverizing action. The use of non-spherical objects, either alone or in conjunction with spherical balls and/or pebbles, and/or possibly the use of scraping agitator and/or a plow, in a double conical mill will be found to give excellent results.

It is to be understood that any of the foregoing methods for reducing, and maintaining, the reagent salt in the desired very finely divided state may be used alone, or in any desired combination.

The process is more particularly illustrated by means of the following example.

Example 1

A 50% butadiene fraction was contacted with an excess of finely divided cuprous chloride in a horizontal ball mill for a period of 110 minutes at a temperature of 25° C. and a pressure of 40 lbs./sq. in. A portion of the unreacted material was removed by reducing the pressure on the system to atmospheric pressure, after which a vacuum equivalent to 400 mm. of mercury, absolute, was applied for a period of one half hour at a temperature slowly increasing from 25 to 30° C. to remove the remainder of the olefine fraction, which contained 6% butadiene.

The temperature was raised rapidly to 60° C., during which small quantities of a recycle stock containing 57.4% butadiene was recovered.

The butadiene-cuprous chloride complex then was decomposed by heating to a temperature of 60–100° C. for a period of ½ hour at a pressure of 400 mm. of mercury, absolute. The product obtained contained 98.8% butadiene.

An outstanding feature of my invention is that it is preferably carried out in a substantially non-aqueous system, or in other words in the substantial absence of water. Since in industrial processes of this general character the presence of some moisture is unavoidable, such moisture preferably should not be permitted to accumulate in quantities greater than 2% by weight of solid dry salt and more preferably not greater than 1% by weight of said salt. Substantially lower tolerances are recommended.

Conceivably larger quantities of water may be present with the realization of some of the advantages of my invention but with a sacrifice of others.

An example of fine division of the reagent salt employed in my invention is a state of subdivision in which the majority of the particles present are less than 0.05 mm. and more particularly less than 0.03 mm. in diameter.

While various procedures have been particularly described these are of course subject to considerable variation. Therefore, it will be understood that the foregoing specific examples are given by way of illustration, and that changes, omissions, substitutions, and/or modifications might be made within the scope of the claims without departing from the spirit of the invention.

I claim:

1. A process for concentrating a butadiene-containing mixture with respect to butadiene comprising contacting said mixture with a substantially non-aqueous reagent containing at least one solid monovalent salt of copper to form a butadiene-reagent salt complex, removing unreacted material by distillation conducted at least in part under subatmospheric pressure and under temperature conditions at least as high as 25° C. but at least 5° C. below the decomposition temperature of said butadiene-reagent salt complex under the pressure conditions obtaining, and thereafter decomposing said butadiene-reagent salt complex.

2. A process for concentrating butadiene in a light oil butadiene fraction also containing hydrocarbon material having less than two double bonds per molecule comprising contacting said fraction with a substantially non-aqueous reagent containing at least one solid monovalent salt of a metal selected from the group consisting of copper, silver, and mercury to form a butadiene-reagent salt complex, removing unreacted material including said other hydrocarbon material by distillation conducted at least in part under subatmospheric pressure and under temperature conditions at least as high as 25° C. but at least 5° C. below the decomposition temperature of said butadiene-reagent salt complex under the pressure conditions obtaining, and thereafter decomposing said butadiene-reagent salt complex.

3. A process for obtaining butadiene in more concentrated form from a mixture containing the same comprising contacting said mixture with solid cuprous chloride in the absence of more than 2% by weight of water based on said cuprous chloride to form a butadiene-cuprous chloride complex, removing unreacted material by distillation conducted at least in part under subatmospheric pressure and under temperature conditions at least as high as 25° C. but at least 5° C. below the decomposition temperature of said butadiene-cuprous chloride complex under the pressure conditions obtaining, and thereafter decomposing said butadiene-cuprous chloride complex by further heating at a temperature at least as high as the decomposition temperature of said complex under the pressure conditions then obtaining.

4. A process for obtaining butadiene in more concentrated form from a mixture containing butadiene and obtained by the pyrolysis of alcohol comprising contacting said mixture with a reagent comprising at least one solid monovalent salt of a metal selected from the group consisting of copper, silver, and mercury to form a butadiene-reagent salt complex; said reagent containing less than 2% by weight of moisture based on said salt, removing unreacted material by distillation conducted at least in part under subatmospheric pressure and under temperature conditions at least as high as 25° C. but at least 5° C. below the decomposition temperature of said butadiene-reagent salt complex under the pressure conditions obtaining and thereafter decomposing said butadiene-reagent salt complex by further heating at a temperature at least as high as the decomposition temperature of said complex under the pressure conditions then obtaining.

5. A process for obtaining butadiene in more highly refined form from a mixture containing the same and containing other hydrocarbon material of 4 carbon atoms per molecule comprising contacting said mixture with a reagent comprising at least one solid monovalent salt of a metal selected from the group consisting of copper, silver, and mercury to form a butadiene-reagent salt complex, said reagent containing less than 1% by weight of water based on said salt, removing unreacted material including said other hydrocarbon material of 4 carbon atoms per molecule by distillation at least the latter part of which is conducted at subatmospheric pressure and under temperature conditions at least as high as 25° C. but at least 5° C. below the decomposition temperature of said butadiene-reagent salt complex at the pressure employed, and thereafter decomposing the said butadiene-reagent salt complex by further heating at a temperature at least as high as the decomposition temperature of said complex under the pressure conditions then obtaining.

6. A process for concentrating butadiene from a mixture containing the same comprising contacting said mixture with a reagent comprising at least one solid monovalent salt of a metal selected from the group consisting of copper, silver, and mercury to form a butadiene-reagent salt complex, said reagent containing less than 1% by weight of moisture based on said salt, removing unreacted material by distillation at least the latter part of which is conducted at subatmospheric pressure and under temperature conditions at least as high as 25° C. but at least 10° C. below the decomposition temperature of said butadiene-reagent salt complex at the pressure employed, and thereafter decomposing the said butadiene-reagent salt complex by further heating under subatmospheric pressure conditions and under temperature conditions at least as high as the decomposition temperature of said complex under the pressure conditions then obtaining.

7. In a process for concentrating butadiene contained in a mixture also containing hydrocarbon material having less than two double bonds per molecule which comprises contacting said mixture with a solid monovalent salt of a metal selected from the group consisting of copper, silver, and mercury in the absence of more than 2% by weight of water based on said salt, subjecting the resulting reaction mass to distillation to remove unreacted material, and decomposing said butadiene-reagent salt complex to recover butadiene therefrom, the step comprising removing unreacted material from said reaction mass by distillation conducted under subatmospheric pressure conditions and under temperature conditions at least as high as 30° C. but at least 5° C. below the decomposition temperature of said butadiene-reagent salt complex under the pressure conditions obtaining.

8. In a process for recovering butadiene in more concentrated form from a mixture containing the same and also containing other hydrocarbon material of four carbon atoms per molecule and of less than two double bonds per molecule which comprises contacting said mixture with solid cuprous chloride in the absence of more than 1% by weight of water based on said cuprous chloride, removing unreacted material from the reaction mass by distillation thereof, and thereafter decomposing said butadiene-reagent salt complex by the application of heat to recover butadiene therefrom, the steps comprising removing said unreacted material from said reaction mass by distillation at least the latter part of which is conducted under subatmospheric pressure conditions and under temperature conditions at least as high as 30° C. but at least 10° C. below the decomposition temperature of said butadiene-reagent salt complex under the pressure conditions obtaining, said distillation being continued until substantially all of said unreacted material is removed, and then increasing the temperature above the decomposition temperature of said butadiene-reagent salt complex under the temperature conditions obtaining to decompose said complex and to recover butadiene therefrom.

FRANK J. SODAY.